July 4, 1961 E. H. BARCLAY 2,990,998
CONTAINER STRUCTURE
Filed Oct. 30, 1958

Inventor
EARLE H. BARCLAY
By Donald A. Gardiner Jr.
Attorney

> United States Patent Office 2,990,998
Patented July 4, 1961

2,990,998
CONTAINER STRUCTURE
Earle H. Barclay, Cleveland, Ohio, assignor to Dairypak Butler, Inc., Cleveland, Ohio, a corporation of Ohio
Filed Oct. 30, 1958, Ser. No. 770,633
8 Claims. (Cl. 229—43)

This invention relates generally to the container art and closure therefor, and more particularly to a container and a plastic or similar material top closure or lid therefor for use in the handling of food articles and storage of such articles and is an improvement upon that disclosed in my earlier application S.N. 719,589, filed March 6, 1958, of which this application is a continuation-in-part.

It is well known that many foods and particularly dairy products such as cottage cheese require a container having a tight seal closure to retain the food flavor and at the same time to exclude other odors which would contaminate or be absorbed by the food within the container.

At the present time, the degree of tightness of the lids or closures for such containers determines the difficulty with which such lids or closures may be emplaced upon and removed from the container. Also, the present day lids or closures are not particularly adapted so that they may be stacked for shipping and for machine assembly with the container.

An important object of this invention is to provide a lid or closure and a container that will provide an effective seal with a minimum of friction or drag while being applied to or removed from the container and which may be repeatedly re-used without damage to the container or the lid.

Another object of this invention is to provide a lid for such a container that may be supplied in stacked relation and readily positioned for machine assembly with the container.

Another object of the invention is to provide such a lid of plastic, such as high-impact polystyrene or other materials having similar qualities that are structurally sound, commercially acceptable, inexpensive to manufacture and attractive in appearance.

Still another object of the invention is to provide a container that is suitable for easy assembly with a plastic lid or closure.

Other objects and advantages more or less ancillary to the foregoing and the manner in which all of the various objects are realized, will appear in the following description which considered in connection with the accompanying drawing, sets forth the preferred embodiment of the invention.

Figure 1:
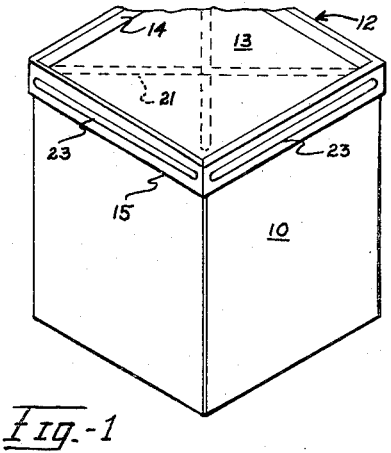
FIGURE 1 is a perspective view of a square container and the improved lid therefore in its place upon the container.

In FIGURE 1 the box or container portion is indicated at 10. It is shown preferably square and made of paper or cardboard or any similar self-sustaining material in the usual manner with the interior and exterior walls coated with wax, paraffin or other material where necessary to render the container fluid tight for a reasonable period of use. The top edge portion 11 of the container is adapted to receive the lid or cover portion 12 shaped in plan view to coincide with the plan view of the container.

While the container illustrated is square in plan view, however, it should be understood that the container in plan view may be of any commercially practical shape so long as the top of the side walls terminate as shown, and that the lid or cover will have a corresponding shape to receive the top edge portion 11 of the container. For convenience the container illustrating the invention is polygonal, the word polygonal as used herein includes a shape that is a square.

The lid illustrated is made of high-impact polystyrene that is molded to the form shown in the drawing annexed hereto. The many advantages of high-impact polystyrene for use in the food-stuff container art are well known. However, the lid may be formed of other materials than that of a plastic nature so long as the material is self-sustaining, i.e. thin aluminum sheet or heavy foil, by way of example.

Figure 3:
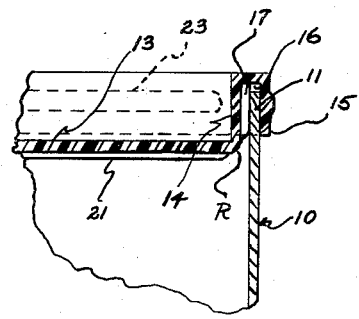
FIGURE 3 is a fragmentary elevational sectional view of the container and lid as shown in FIG. 1 illustrating the frictional engagement of one of the ribs and the skirt of the lid with the container wall.

The lid 12 is provided with a square central depressed portion 13 and a continuous marginal side wall 14 upwardly disposed at a substantial right angle to the depressed portion 13 and an integral outwardly and downwardly depending continuous skirt portion 15 disposed parallel to and spaced from the said side wall 14 and terminating in a plane disposed parallel to but spaced above the bottom of the depressed portion 13. The side wall 14 and the skirt 15 define a peripheral channel 16 to detachably receive the said top edge 11 of the container as shown in FIGURE 3. It will be noted that said channel 16 is slightly wider, i.e., the perpendicular distance between wall 14 and skirt 15 is greater than the thickness of the container top edge portion 11.

Figure 5:
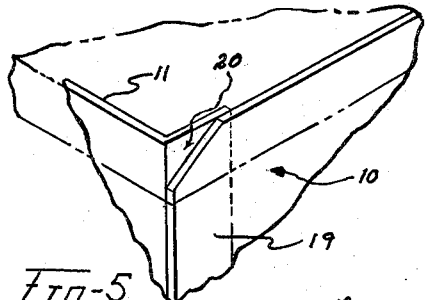
FIGURE 5 is a fragmentary enlarged perspective of a container having a glued overlap seam and the manner of modification thereof.

The marginal side wall 14 of the lid is provided with ribs 17 which are disposed in spaced apart relation on the channel side 16 of said side wall 14 and are substantially semi-circular in plan view as shown in FIGURE 5 and project into the area defined within the channel and with a radius thereof in size sufficient to effectuate a frictional engagement of the ribs 17 and the inner side of the container wall portion 11, and a frictional engagement and seal between the outer side of the said wall portion 11 and the skirt 15 as shown in FIGURE 3.

The marginal sealing structure of the lid as described, is highly effective and results in advantages not realized in cover structures as used hereinbefore. It will be noted that the spacing of the ribs 17 is such that the edges of container walls 11 are forced outwardly against the inside of the skirt portion 15 as soon as the lid is engaged with the container such that the skirt 15 engages these wall edges. This sealing is extremely important in that it assures that, even if the cover or lid is not forced completely down on the container, sufficient sealing between lid or cover and container is effected to prevent leakage. Too, if in subsequent handling a cover should be accidentally dislodged to some degree the seal is not broken. These two results flowing from the novel seal represent vast improvements over the usually available covers or lids which must be forced into a condition of maximum engagement with the container to assure an adequate seal and in which any relatively slight dislodgement thereof results in a breaking of the seal with the expected adverse results.

It will be noted that the spacing of the ribs 17 along the length of the channel is such that their effect in forcing the container edge outwardly is substantially a constant or continuous effort from rib to rib. In other words, the spacing between ribs is such that there is no inward sag or bow of the container edge between any two adjacent ribs. Obviously then the rigidity or lack of rigidity of the container wall will determine to a considerable extent the optimum spacing between ribs 17, though in some cases it may be advisable to have a great number of closely spaced ribs. Generally, however, the choice of rib spacing can be said to be a function of container rigidity and the most economical use of the material, remembering that some materials from which covers and lids employing the inventive concepts herein disclosed may be fabricated are comparatively expensive and hence the amount of material used in each cover is of considerable import.

Where the container is of polygonal cross section as is the example of FIG. 1, etc., it will be noticed that a rib 17 is disposed at each corner, projecting outwardly at such an angle as to engage two walls of the container which may form such corner. This arrangement assures proper sealing of the lid to the container at the corners.

In order to further assure a proper seal between the lid and the container the container itself is provided with a further yet simple modification. The usual container construction has the overlapping side wall glue seam 19 as shown in FIGURE 5 adjacent the container side wall edge joint. The preferred lid has one of the ribs 17 positioned at each corner of the lid channel 16. To provide a uniform said frictional engagement between the ribs 17, the top edge portion 11 and the skirt 15, a portion 20 of the outer layer of the overlapping glue seam 19 of said container side wall has been removed as shown in FIGURE 5. The removed portion 20 should be preferably substantially triangular in shape and should be limited in its size to be less than the depth of the said skirt 15 and no less than the length of the rib 17 regardless of whether skirt 15 is long or short as will be described.

Figure 6:
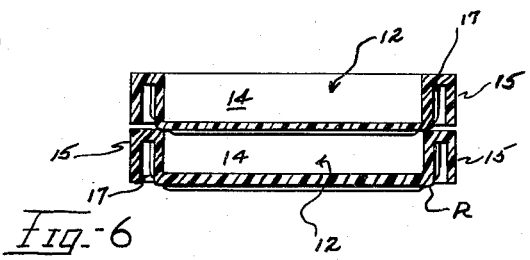
FIGURE 6 is a side elevational view of a stack of the improved lids.
Figure 7:
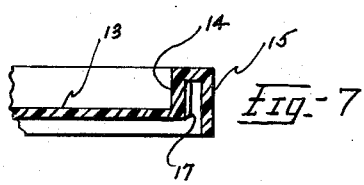
FIGURE 7 is a fragmentary enlarged sectional view of a cover embodying the invention and being provided with a "long" skirt portion, in contradistinction to the short skirt of FIGURES 1, 3 and 6.

In my aforesaid earlier application the invention was disclosed in such a manner that, while incorporating the basic structure above described, the peripheral skirt 15 was shown as projecting below a plane in which the depressed central portion 13 of the cover might be disposed. While this structure will be found to be satisfactory in most applications it has been found advantageous to terminate the skirt 15 short of this plane such that the lids will freely eject from certain automatic feeding machines. In some instances the edge of the "long" skirt were prone to hang up or catch in certain machines. Additionally it has been found that by using the "short" skirt satisfactory stacking of the lids can be attained as shown in FIG. 6. It will be noted that in the drawing, FIGURE 7 is an example of the earlier type of skirt having its edge projecting below a plane in which central depressed portion 13 might be disposed.

Figure 2:
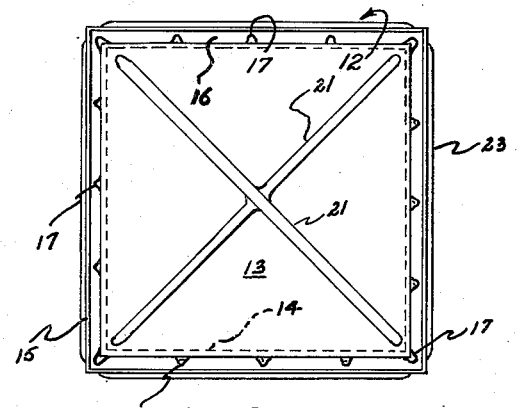
FIGURE 2 is a bottom plan view of the improved lid illustrating the ribs in the channel defined by the skirt and side wall of the depressed central portion thereof, and showing the central reinforcing ribs.
Figure 4:
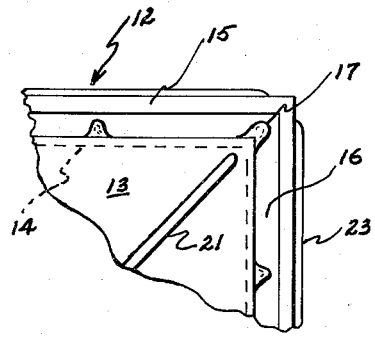
FIGURE 4 is an enlarged fragmentary bottom plan view showing disposition of a corner rib.

Additionally, several other structural features which may be incorporated in the lid or cover 12 must be considered. Referring to FIGURES 2 and 4 in particular it may be seen that certain parts of the cover 12 may be provided with reinforcing ribs 21 and 23 respectively. Ribs 21 are formed on the bottom surface of the central depressed portion 13 and serve to reinforce this area to prevent bowing thereof downwardly. Ribs 23, on the other hand, may be provided on skirts 15 defining a part of the channel 16 to rigidify this skirt against bowing.

The ribs 21 and 23 will not be used in all cases, but are a particular advantage where the container is of large size and hence the diagonal distance from corner to corner of portion 13 is considerable, and where the distance from corner to corner of skirt 15 is substantial. Because of the thinness of these parts and their relatively large span the use of ribs 21 and 23 is very satisfactory. However, where the lids or covers 12 are used for smaller size containers or are of heavier construction, i.e., thicker, more often than not the ribs 21 and 23 or, alternatively, either, may be dispensed with entirely. FIGURES 6 and 7 are illustrative of the latter construction, FIGURES 1, 2, 3 and 4 of the former construction.

Further, it will be noted that the corner defined between the bottom portion 13 and the channel side of side wall 14 is rounded as indicated by the letter R in FIGURE 3. This facilitates indexing of the cover 12 on the container 10.

Although the cover has been described as made from high-impact polystyrene it will be understood that other equivalent materials or resins may be employed provided they have the properties as herein described.

The foregoing description is necessarily of detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A container comprising a shaped body portion and a removable cover portion, said body portion being formed of a substantially rigid, self-sustaining material substantially impervious to fluids, said cover portion being formed of a rigid material and comprising a central depressed portion having a flat bottom and an integral upwardly extending peripheral side wall at right angles thereto, said side wall having a depending skirt formed integrally therewith and disposed substantially parallel thereto and spaced therefrom to provide a channel for receiving the upper portion of the container body, spaced ribs vertically disposed within the channel and formed integrally with said upwardly extending, peripheral sidewall, said ribs being substantially semi-circular in cross section, said ribs further having radii of sufficient length to effectuate a frictional engagement of said ribs with the upper inner wall of said body portion and a frictional engagement and seal between the said skirt and the upper outer wall of said body portion without mutilation of said ribs to enable repeated re-engagement of said cover with said container body.

2. A cover for containers comprising a substantially rigid shape comprising a central depressed portion having a flat bottom and an integral upwardly extending peripheral side wall at right angles thereto, said side wall being provided with a depending skirt formed integrally with, spaced from and substantially parallel thereto to define therewith a peripheral channel for receiving the upper portion of a container, said channel having spaced integral ribs vertically disposed therein and formed integrally with said side wall thereof and being substantially semi-circular in cross section, said ribs having radii of sufficient length to effectuate a frictional engagement of said ribs with the upper adjacent wall of a container body portion and a frictional engagement and seal between the opposite channel wall and the upper opposite wall of the container body portion without mutilation of said ribs.

3. A cover for containers as defined in claim 2 wherein said depending skirt terminates in a plane spaced above the plane of said central depressed portion.

4. A cover for containers as defined in claim 2 wherein said depending skirt extends below the said central depressed portion.

5. A container comprising a polygonal shaped body portion and a removable polygonal shaped cover portion, said body portion being fabricated of a coated cellulosic material substantially impervious to fluids, said cover portion being of high-impact polystyrene plastic material and comprising a central depressed portion having a flat bottom and an integral upwardly extending peripheral side wall at right angles thereto, said side wall having an integral depending skirt extending below said side wall and substantially parallel thereto to provide a channel for receiving the upper portion of the container body portion, said side wall having spaced integral ribs vertically disposed on and extending across the channel side thereof and substantially semi-elliptical in cross section with their transverse axes at right angles to said side wall, said ribs having said transverse axes of sufficient length to effectuate a frictional engagement of said ribs with the upper inner wall of said body portion and a frictional engagement and seal between the said skirt and the upper outer wall of said body portion without mutilation of said ribs and said skirt.

6. A container comprising a polygonal shaped body portion and a removable polygonal shaped cover portion, said body portion formed from a coated cellulosic material substantially impervious to fluids, and further including with an overlapping side wall glue seam having a portion of the outer layer removed to permit single side wall indexing with said cover, said cover portion being of high-impact polystyrene plastic material and comprising a central depressed portion having a flat bottom and an integral upwardly extending peripheral side wall at right angles thereto, said side wall having a depending skirt formed integrally with but spaced from and substantially parallel to said peripheral side wall to define therewith an inverted, peripheral channel for receiving the upper portion of the container, said side wall having spaced integral ribs vertically disposed on the channel side thereof and substantially semi-circular in cross section, said ribs having radii of sufficient length to effectuate a frictional engagement of said ribs with the upper inner wall of said body portion and a frictional engagement and seal between the said skirt and the upper outer wall of said body portion.

7. A container as defined in claim 6 wherein said depending skirt terminates in a plane spaced slightly above that defined by said central depressed portion of said cover portion.

8. A container as defined in claim 6 wherein said depending skirt terminates in a plane disposed below that defined by said central depressed portion of said cover portion.

References Cited in the file of this patent
UNITED STATES PATENTS

| | | |
|---|---|---|
| 1,815,970 | Eggerss | July 28, 1931 |
| 2,396,337 | Moore | Mar. 12, 1946 |
| 2,606,586 | Hill | Aug. 12, 1952 |
| 2,636,640 | Bedford | Apr. 28, 1953 |
| 2,638,261 | Poole | May 12, 1953 |
| 2,644,978 | Becker | July 14, 1953 |
| 2,901,098 | Tupper | Aug. 25, 1959 |